July 19, 1949.
L. R. HEIM
2,476,728
METHOD FOR FREEING MECHANICAL JOINTS
Filed Dec. 14, 1942
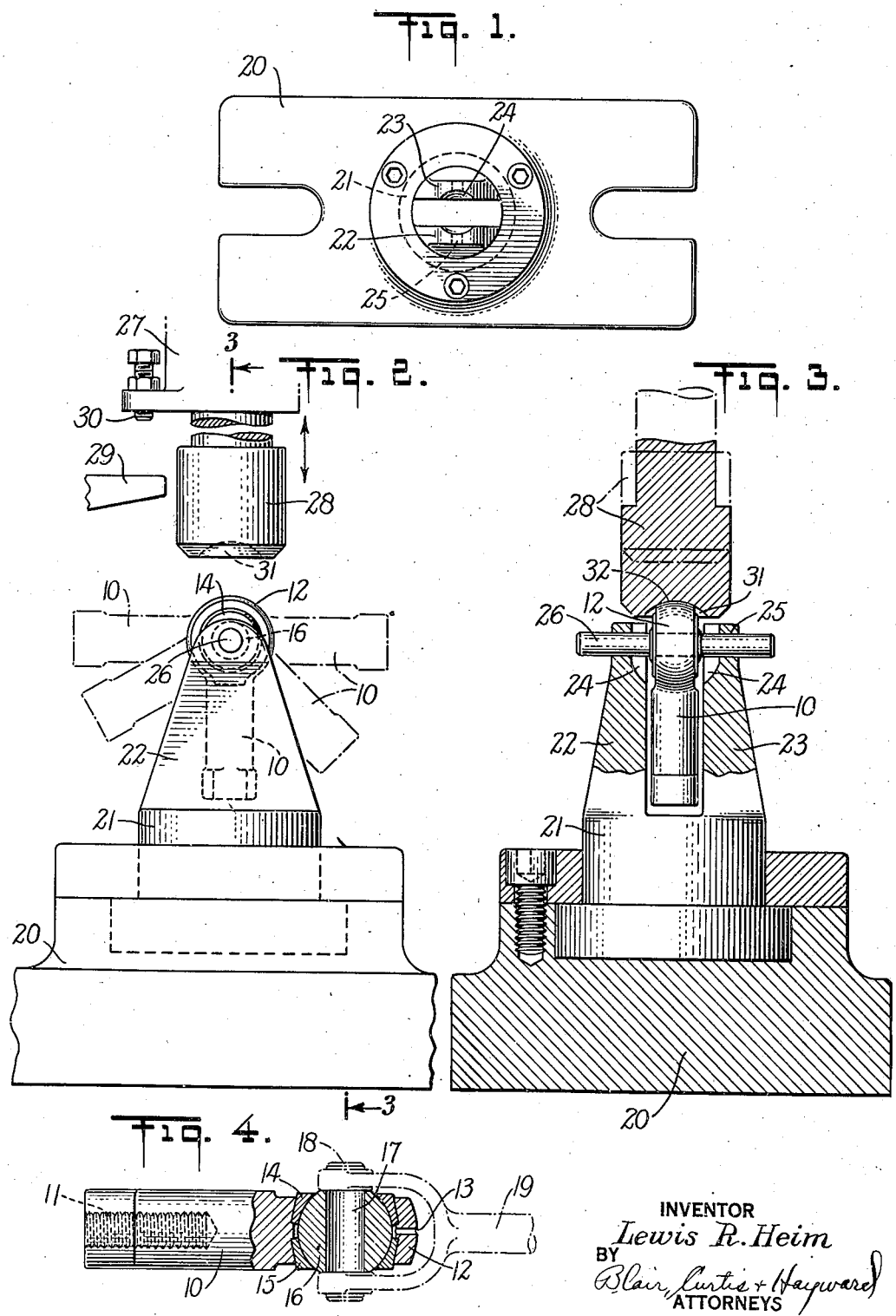
INVENTOR
*Lewis R. Heim*
BY
*Blair, Curtis + Hayward*
ATTORNEYS Patented July 19, 1949

2,476,728

UNITED STATES PATENT OFFICE 2,476,728

METHOD FOR FREEING MECHANICAL JOINTS

Lewis R. Heim, Fairfield, Conn., assignor to The Heim Company, Fairfield, Conn., a corporation of Connecticut Application December 14, 1942, Serial No. 469,028

4 Claims. (Cl. 29—149.5)

This invention relates to the mechanical treatment of bearings to ease their action preparatory for use.

One of the objects thereof is the provision of simple, practical, and efficient method for freeing bearings or the like for easy relative movement of the bearing members. Another object is to provide a simple and practical art for remedying excessive tightness of bearings. Other objects will be in part obvious and in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the appended claims.

Referring, now, to the accompanying drawing in which is shown one of various possible embodiments of the mechanical features of this invention, Figure 1 is a plan of the lower portion of a device for the above treatment of bearings;

Figure 2 is an end elevation of the device partially in diagrammatic form;

Figure 3 is a sectional elevation taken substantially along the line 3—3 of Figure 2; and Figure 4 is a plan of a bearing suitable for treatment in the above device and partially cut away to show the interior construction more clearly.

Similar reference characters refer to similar parts throughout the several views of the drawing.

As conducive to a clearer understanding of certain features of this invention, it may be noted that in many bearings, which term is used in a broad sense throughout this application, the construction or method of manufacture is such that when completed the inner member is so tightly gripped by the parts within which it relatively swings or rotates that it is ill-prepared to be put into practical use. In a non-adjustable bearing in such condition it is difficult to ease the fit of these parts to exactly the desired degree while maintaining the uniformity of contact between the meeting surfaces throughout the range of their relative movement in use. The solution of this problem in a simple and practical manner is one of the dominant aims of this invention.

Considering, now, the construction of a bearing or joint of the type just referred to, there is shown in Figure 4 of the drawings an outer member 10 having at one end a threaded recess 11 adapted to receive and retain a rod or the like. At the other end this outer member is given a circular form as shown at 12 and possibly provided with an oil hole 13. Within this ring-like part 12 are fitted, in any desired manner, a pair of bearing rings 14 and 15 whose inner surfaces embrace the inner bearing member 16. The part 16 in this case takes the form of a ball, preferably of steel, whose bearing surface is spherical. The inner member 16 is provided with a central bore 17 through which slidably fits the pin 18, the ends of which are respectively fixed in the ends of a rod 19 forked so as to straddle and swing about the ball 16, all as indicated in dotted lines.

It will thus be seen that the rods respectively attached to the outer member 10 and inner bearing member 16 may be swung relatively to a certain extent in any direction and in some directions the relative swing is unlimited. In the manufacture of this device it is found that when it is completed, due to the pressure of assembly of the parts, the ball member 16 is so tightly gripped that it is difficult to move it freely within its seat formed by the relatively soft members 14 and 15.

Referring, now, to the device shown in Figures 1, 2, and 3 of the drawings in which the illustrative form shown in Figure 4 is mounted, there is a base 20 having mounted therein a support 21 with two rigid upwardly extending arms 22 and 23 the opposing faces of which are provided with round recesses 24. At the central portion of each of these recesses the members in which they are formed are provided with registering openings 25 into which a steel rod 26 is slidably fitted.

Rod 26 is of such size as to fit slidably within the bore 17 of the bearing or joint, and thus this device is rigidly supported and yet capable of a free swinging movement as indicated in the dotted positions of Figure 2.

Immediately above the bearing thus supported is the ram of a power press diagrammatically indicated at 27 carrying the punch or die 28, which is thus capable of being reciprocated vertically at any desired speed and throughout any desired range of travel. This motion, indicated by the double arrow in Figure 2, is controlled and its downward movement precisely limited by any suitable adjustable means, well known in machines of this type. Merely as a diagrammatic illustration of this adjustment, there is shown in the drawings a fixed abutment 29 acting as a stop for a set screw 30 shown as mounted upon the ram.

The die 28 has formed in its under surface a recess 31 of spherical shape and of the same radius of curvature of the circular outer member 12 as well as of the transverse crowning of that member indicated at 32 in Figure 3. Thus, however the outer member 10 is swung, whether about the axis of the support 26 or to a certain extent laterally with respect to that axis, its outermost surface is in position to be exactly fitted by the recess 31 when the die 28 descends. It is to be understood that normally the outer member 10 is of harder metal than the inner bearing rings 14 and 15.

In the use of this mechanism, the device shown in Figure 4 is mounted in position, as shown in the upper figures of the drawing, by the rigid steel rod 26. The press is then so adjusted, as by the set screw 30 or other equivalent means, as to carry the die on its downward stroke slightly beyond its point of engagement with the rounded outer surface of the bearing. This excess downward movement is carefully controlled as it determines the amount of looseness which is given to the bearing. In the above action the rigidly supported ball 16 is in effect used as a die to compress the meeting surfaces of the members 14 and 15 to a minute degree and to a corresponding extent to lessen the tightness of fit between these parts.

As the bearing is repeatedly engaged and pressed by the die 28, the former is swung throughout the various positions indicated in dotted lines, and also, if desired, to a slight extent laterally. The loosening of contact is thus made uniform throughout, for the die does not travel below the predetermined limit and hence a greater number of engagements of the die with the part 12 at one angle than another does not detract from the uniformity of compression. Also, the exactness of fit is maintained in all respects between the inner member of the bearing, the ball 16, and the parts within which it rests, for, as above noted, it is this part which shapes the members 14 and 15 as it is forced against them.

It will thus be seen that there is provided apparatus and an art well adapted for practical use at a high rate and by which the objects of this invention are achieved.

As many possible embodiments may be made of the mechanical features of the above invention, and as the art herein described might be varied in various parts, all without departing from the scope of the invention, it is to be understood that all matter hereinbefore set forth or shown in the accompanying drawing is to be interpreted as illustrative and not in a limiting sense.

I claim:

1. The herein described art for providing a bearing with the desired freedom of bearing surfaces, which consists in forming an inner bearing member with an outer surface of revolution and with a central bore therethrough, forming a round outer bearing member fitting closely about the inner member and with an inner surface substantially non-resilient and softer than the surface of said inner bearing member, supporting the bearing by the bore of the inner member and thereby holding said member against movement in a direction transverse to its axis, and exerting pressure over the surface at one side of said outer member leaving the opposite side thereof free, said pressure being in a direction toward the support of the inner member and said pressure being of a degree sufficient to force the inner member into the inner surface of the outer member to such extent as to give the desired running fit between said bearing members without deforming the inner member.

2. The herein described art for providing a bearing with the desired freedom of bearing surfaces, which consists in forming an inner bearing member with an outer surface of revolution and with a central bore therethrough, forming a round outer bearing member fitting closely about the inner member with an inner surface substantially non-resilient and softer than the surface of said inner bearing member, revolubly supporting the bearing by the bore of the inner member and thereby holding said member against movement in a direction transverse to its axis, intermittently exerting pressure over the surface at one side of said outer member leaving the opposite side thereof free, said pressure being in a direction toward the support of the inner member and said pressure being of a degree sufficient to force the inner member into the inner surface of the outer member to such extent as to give the desired running fit between said bearing members without deforming the inner member, and simultaneously swinging said bearing members about the axis of said supporting means.

3. The herein described art for providing a bearing with the desired freedom of bearing surfaces, which consists in forming an inner bearing member with a spherical outer surface and with a central bore therethrough, forming an outer bearing member fitting closely about the inner member with a spherical outer surface and an inner surface substantially non-resilient and softer than the surface of said inner bearing member, revolubly supporting the bearing by the bore of the inner member and thereby holding said member against movement in a direction transverse to its axis, intermittently exerting pressure over the surface at one side of said outer member leaving the opposite side thereof free, said pressure being in a direction toward the support of the inner member and said pressure being of a degree sufficient to force the inner member into the inner surface of the outer member to such extent as to give the desired running fit between said bearing members without deforming the inner member, and simultaneously swinging said bearing members about the axis of said supporting means.

4. The herein described art for providing a bearing with the desired freedom of bearing surfaces, which consists in forming an inner bearing member with an outer spherical surface and a central bore therethrough, forming an outer bearing member fitting closely about the inner member with an inner surface substantially non-resilient and softer than the surface of said inner bearing member, supporting the bearing by the bore of the inner member and holding said member against substantial movement in any direction transverse to its axis, intermittently exerting pressure on the surface at one side of the outer member leaving the opposite side thereof free, said pressure being in a direction toward the support of the inner member and being of a degree sufficient to force the inner member into the inner surface of the outer member to such extent as to give the desired running fit between said bearing members and rotating said members about the axis of said bore to vary the portions which are subjected to such pressure.

LEWIS R. HEIM.

REFERENCES CITED

The following references are of record in the file of this patent:

UNITED STATES PATENTS

| Number | Name | Date |
| --- | --- | --- |
| 400,143 | Taylor | Mar. 26, 1889 |
| 1,151,005 | Gamble | Aug. 24, 1915 |
| 1,693,748 | Fiegel | Dec. 4, 1928 |
| 1,793,874 | Skillman | Feb. 24, 1931 |
| 1,798,738 | Hoern | Mar. 31, 1931 |
| 1,887,168 | Rauberstrauch | Nov. 8, 1932 |
| 2,086,667 | Fletcher | July 13, 1937 |
| 2,212,705 | Bruce | Aug. 27, 1940 |
| 2,252,351 | Paulus | Aug. 12, 1941 |
| 2,400,506 | Heim | May 21, 1946 |